(12) United States Patent
Yoshimoto et al.

(10) Patent No.: US 6,968,357 B2
(45) Date of Patent: Nov. 22, 2005

(54) INFORMATION COLLECTING SYSTEM AND TERMINAL EQUIPMENT FOR EASE OF RESTORING FROM POWER-OFF DISRUPTION AND TRANSMITTING DIFFERENTIAL INFORMATION

(75) Inventors: Kyosuke Yoshimoto, Tokyo (JP); Kazuo Hirasawa, Tokyo (JP); Nobuo Terazaki, Tokyo (JP); Tatsunori Aizaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 747 days.

(21) Appl. No.: 09/840,053

(22) Filed: Apr. 24, 2001

(65) Prior Publication Data

US 2002/0023125 A1    Feb. 21, 2002

(30) Foreign Application Priority Data

Jul. 24, 2000    (JP)    ............................. 2000-222679

(51) Int. Cl.⁷ ............................................ G06F 15/16
(52) U.S. Cl. .................... 709/203; 709/208; 709/227; 703/21
(58) Field of Search ................................ 709/204, 231, 709/203, 227; 703/21

(56) References Cited

U.S. PATENT DOCUMENTS

| | | | | |
|---|---|---|---|---|
| 5,317,693 A | * | 5/1994 | Cuenod et al. | 710/9 |
| 5,390,132 A | * | 2/1995 | Shioe et al. | 709/224 |
| 5,799,151 A | * | 8/1998 | Hoffer | 709/204 |
| 5,909,569 A | * | 6/1999 | Housel et al. | 703/21 |
| 6,101,601 A | * | 8/2000 | Matthews et al. | 713/2 |
| 6,332,163 B1 | * | 12/2001 | Bowman-Amuah | 709/231 |
| 6,453,343 B1 | * | 9/2002 | Housel et al. | 709/213 |
| 6,882,933 B2 | * | 4/2005 | Kondou et al. | 701/203 |
| 6,883,023 B1 | * | 4/2005 | Wang et al. | 709/220 |
| 2005/0055447 A1 | * | 3/2005 | Gonno et al. | 709/226 |

* cited by examiner

Primary Examiner—Wen-Tai Lin
(74) Attorney, Agent, or Firm—Birch, Stewart, Kolasch & Birch, LLP

(57) ABSTRACT

An information collecting system includes at least one terminal and an application server. The application server includes a receiving section for receiving input information transmitted from the terminal to the information processing center via the network; an information processing section for deciding as to the information received, and for constructing a picture to be displayed on the terminal in response to a decision result; and a transmitting section for transmitting the picture generated by the information processing section to the terminal. The application server further comprises a differential detector for detecting a difference between the client display picture stored in a storage and a client display picture newly generated by a client display screen constructor, wherein said transmitting section transmits only differential information detected by said differential detector to said terminal.

7 Claims, 10 Drawing Sheets

INFORMATION COLLECTING SYSTEM AND TERMINAL EQUIPMENT FOR EASE OF RESTORING FROM POWER-OFF DISRUPTION AND TRANSMITTING DIFFERENTIAL INFORMATION

BACKGROUND OF THE INVENTION

1. Field of the Invention

The present invention relates to an information collecting system and terminal equipment, in which the terminal equipment connected to a network collects information.

2. Description of Related Art

Figure 10:
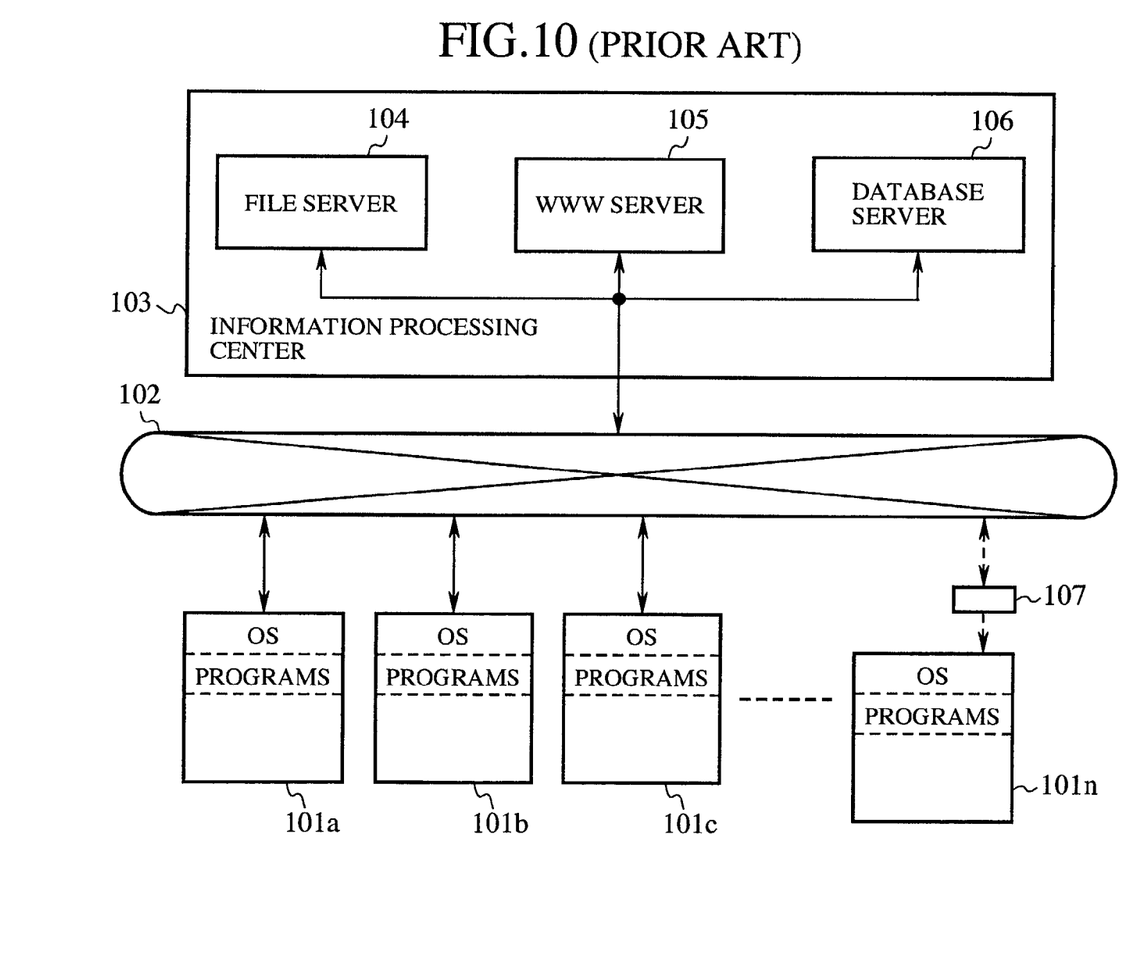
FIG. 10 is a block diagram showing a configuration of a conventional information collecting system.

FIG. 10 is a block diagram showing a configuration of a conventional information collecting system. In FIG. 10, reference numerals 101a–101n each designate a terminal; 102 designates a network to which a plurality of terminals 101a–101n are connected; and 103 designates an information center including a file server 104, a WWW (World Wide Web) server 105, a database server 106 and the like.

The terminals 101a–101n each comprise various application programs operating on an operating system (OS). On the other hand, the terminal 101n is not directly connected to the network 102, but connected via a mobile phone 107 having an information transmitting function to exchange information with the information center 103.

Next, the operation of the conventional system will be described.

When a user activates the terminal 101a, for example, according to a prescribed operating procedure, it exchanges necessary information with the information center 103 via the network 102, carries out required processings using the application programs on the terminal, and displays the processed results.

With such a configuration, the conventional information collecting system requires a prescribed operating procedure to start the terminal. Accordingly, it is difficult for a user unfamiliar with the operation to use the terminal. In addition, since each terminal carries out its processing using its own software, the processing results up to that time will be lost if some power trouble such as a power failure or disconnection takes place. Furthermore, since each terminal installs its own application programs, there arises a problem in that many terminals must change their programs to match their versions to those of the server every time the versions are changed.

SUMMARY OF THE INVENTION

The present invention is implemented to solve the foregoing problem. It is therefore an object of the present invention to provide an information collecting system free from a power trouble by carrying out all information processings in the information processing center. Another object of the present invention is to provide a highly reliable terminal capable of transferring information by only turning on the power with a simple configuration including only an information transmitting and receiving function and a display function without requiring any drive such as a radiating fan, a CD-ROM drive and a hard disk drive. Still another object of the present invention is to provide a terminal capable of coping with the change in the versions of the applications by only changing the applications of the information processing center without changing the software of each terminal.

According to a first aspect of the present invention, there is provide an information collecting system comprising: at least one terminal including an information input device, an information display unit and a communication circuit; and an information processing center that is connected to the terminal via a network, and includes an application server, the application server including: a receiving section for receiving input information transmitted from the terminal to the information processing center via the network; an information processing section for making a decision as to the information received, and for constructing a picture to be displayed on the terminal in response to a decision result; and a transmitting section for transmitting the picture generated by the information processing section to the terminal.

Here, the information processing center may further comprise a database server, a file server and a WWW server, wherein the information processing section in the application server may carry out information processing by exchanging information with these servers.

The terminal may comprise a circuit for detecting power-on of the terminal, and for automatically activating the communication circuit to transmit power-on information to the information processing center.

The receiving section of the application server may receive the power-on information sent from the terminal via the network; the information processing section of the application server may generate an initial picture of the terminal in response to the information received; and the transmitting section in the application server may transmit the initial picture to the terminal.

The information processing section of the application server may comprise a client application memory for storing in advance necessary information including identifying information of a user; and a client display screen constructor for constructing a client display picture from the necessary information read out of the client application memory and information supplied from other servers.

The application server may further comprise a client display picture storage for storing the client display picture generated by the client display screen constructor; and a differential detector for detecting a difference between the client display picture stored in the client display picture storage and a client display picture newly generated by the client display screen constructor, wherein the transmitting section may transmit only differential information detected by the differential detector to the terminal.

The terminal may comprise a picture combiner for combining the differential information sent from the transmitting section with picture information currently displayed by the terminal.

The terminal maybe connected to a LAN (Local Area Network), and the LAN may be connected to the network.

The information collecting system may further comprise a local server connected between the LAN and the network, wherein the local server may include a database server, a file server, a WWW server and an application server for carrying out information processing using information exchanged with these servers, and wherein the local server may perform a processing associated with predetermined requested information in the information transmitted from the terminal, and transmit a processing result to the terminal, whereas the local server may transmit remaining requested information to the information processing center via the network without processing the remaining requested information.

The information processing center may carry out processing associated with predetermined requested information in the information transmitted from the terminal, and transmit remaining requested information to another information processing center via the network without processing the remaining requested information.

The application server in the local server may comprise at least one of a word processing application and a spreadsheet application.

According to a second aspect of the present invention, there is provided a terminal unit comprising: an information input device with a function of converting input information to transmitted information; a communication circuit for transmitting the transmitted information to an information processing center via a network, and for receiving a signal sent from the information processing center via the network; a screen constructor for converting the received signal into a display signal; a display device for displaying the display signal; and a circuit for detecting power-on of the terminal, and for automatically starting the communication circuit to transmit power-on information to the information processing center.

DETAILED DESCRIPTION OF THE PREFERRED EMBODIMENTS

The invention will now be described with reference to the accompanying drawings.

Embodiment 1

Figure 1:
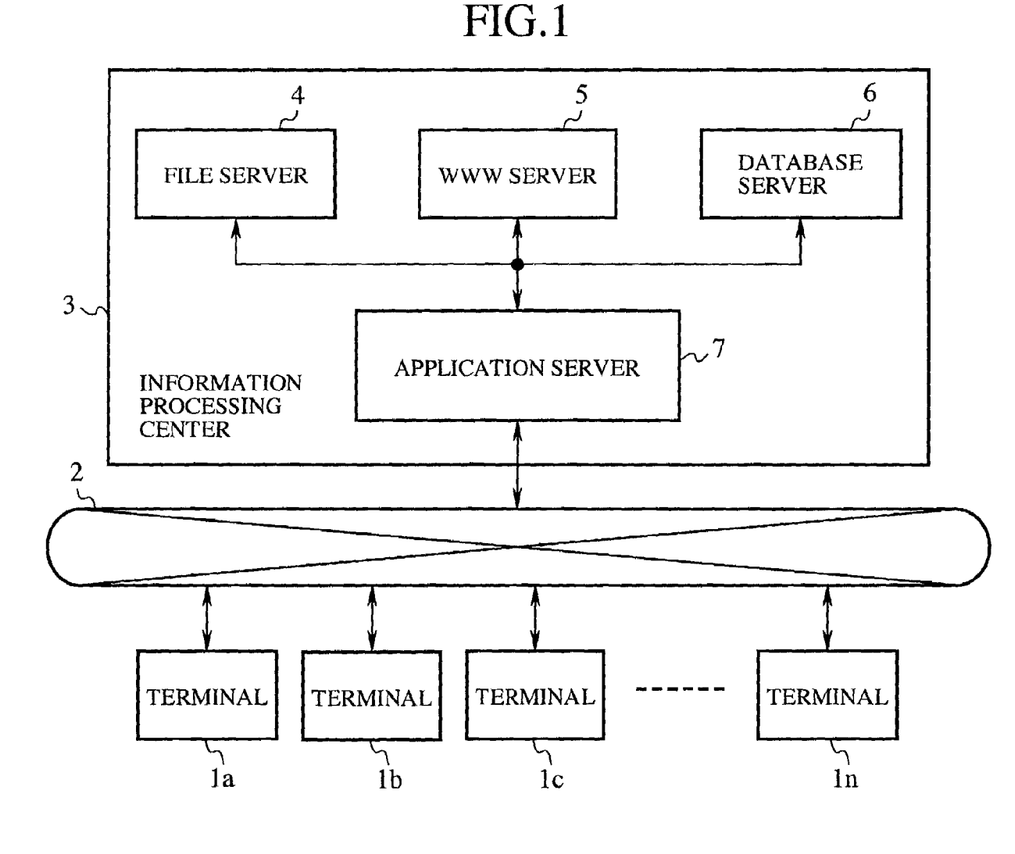
FIG. 1 is a block diagram showing a configuration of an embodiment 1 of an information collecting system in accordance with the present invention.

FIG. 1 is a block diagram showing a configuration of an embodiment 1 of an information collecting system in accordance with the present invention. In FIG. 1, reference numerals 1a–1n each designate a terminal; and the reference numeral 2 designates a network to which the terminals 1a–1n are connected. The network 2 is a normally connected network such as a CATV, full-time Internet service, and radio packet communication service. The reference numeral 3 designates an information processing center including a file server 4 for storing data by file management, a WWW (World Wide Web) server 5 for providing home pages, a database server 6 for managing databases and an application server 7 for executing various applications. The information processing center 3 is in a full-time connectable state.

Figure 2:
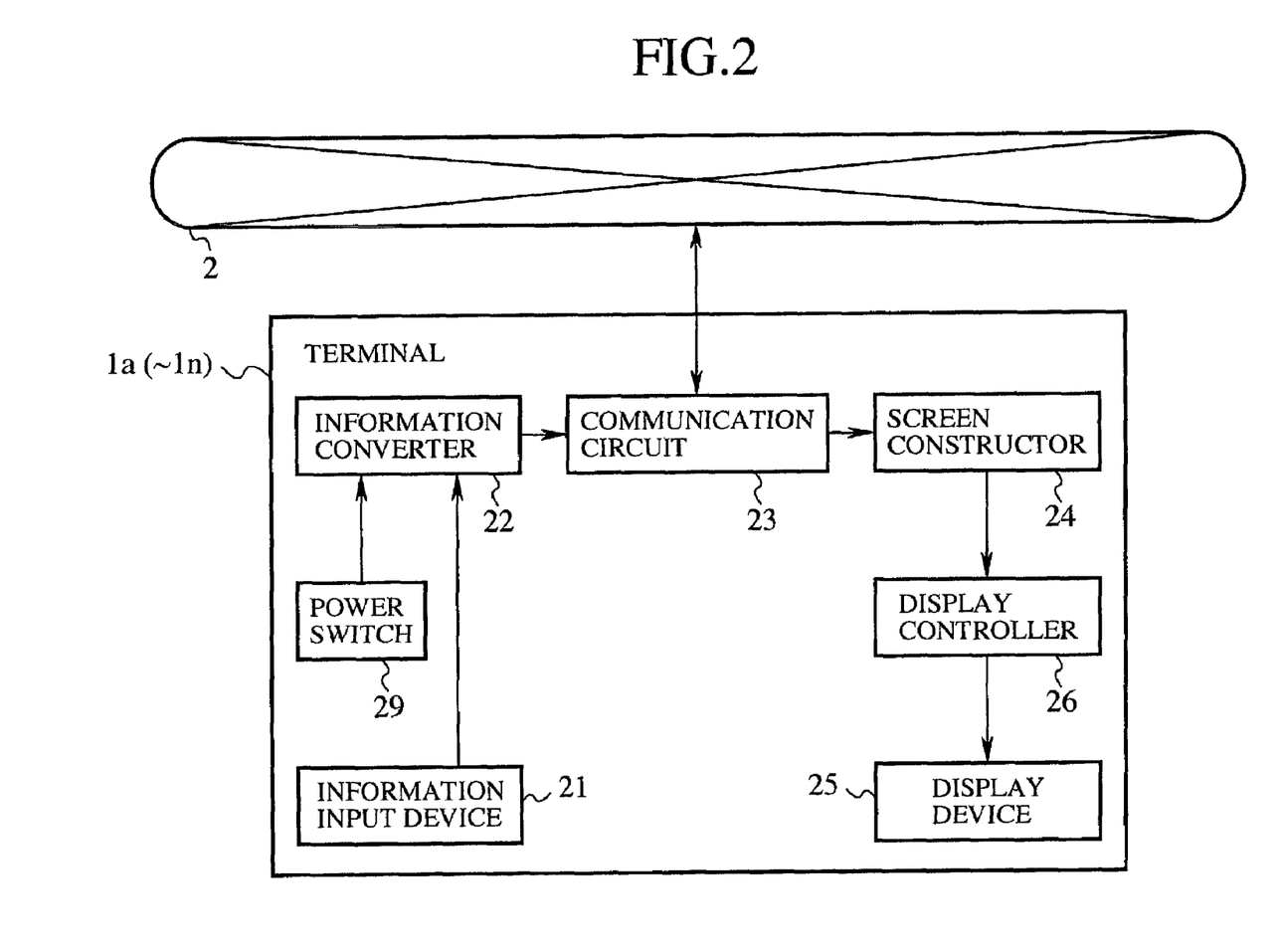
FIG. 2 is a block diagram showing a configuration of a terminal in the embodiment 1 of the information collecting system.

FIG. 2 is a block diagram showing a configuration of one of the terminals 1a–1n. In FIG. 2, the reference numeral 21 designates an information input device for inputting information such as a keyboard and a mouse; 22 designates an information converter for converting information supplied from the information input device 21 to transmitted information; 23 designates a communication circuit for transmitting the transmitted information to the information processing center 3 via the network 2, and for receiving the information transmitted from the information processing center 3 through the network; 24 designates a screen constructor for constructing a display picture from the received information; and 25 designates a display device such as an LCD panel and CRT for displaying the picture generated by the screen constructor 24 through a display controller 26. The reference numeral 29 designates a power switch connected to the information converter 22.

Figure 3:
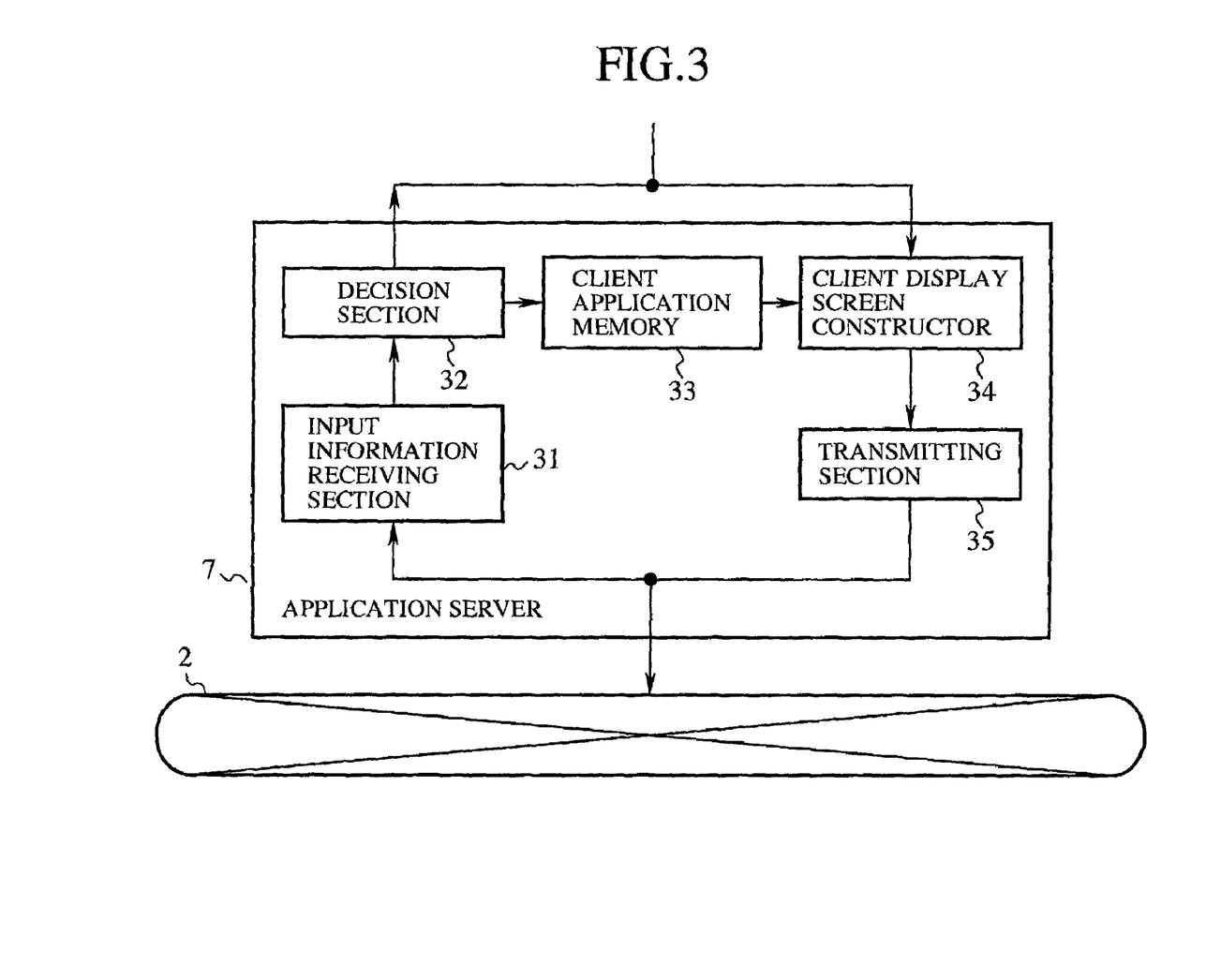
FIG. 3 is a block diagram showing a configuration of an application server 7 in the embodiment 1 of the information collecting system.

FIG. 3 is a block diagram showing a configuration of the application server 7. In FIG. 3, the reference numeral 31 designates an input information receiving section for receiving information transmitted from the terminals through the network 2; 32 designates a decision section for making a decision from the input information, and for issuing a command to the file server 4, WWW server 5 or database server 6; 33 designates a client application memory for prestoring necessary information including client identifying information for individual clients; 34 designates a client display screen constructor for constructing a client display picture from the information read from the client application memory 33 and the information from the servers; and 35 designates a transmitting section for transmitting the picture information generated by the client display screen constructor 34 to the terminals.

Next, the operation of the present embodiment 1 will be described.

Figure 4A:
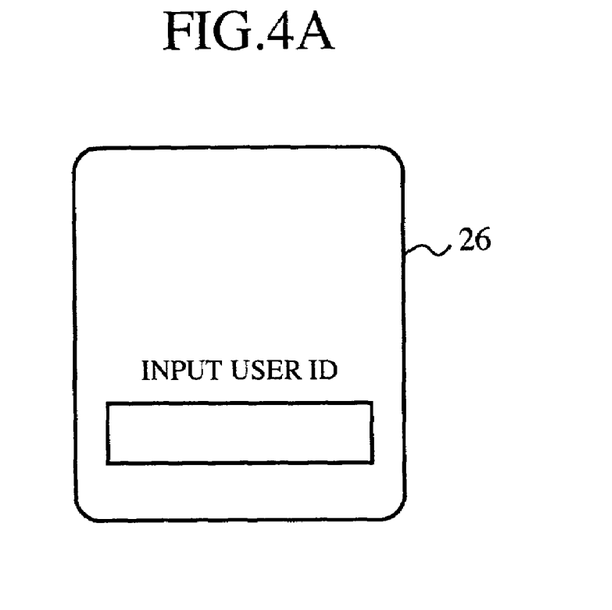
FIGS. 4A and 4B are diagrams illustrating examples of display on the screen of the terminal in the embodiment 1 of the information collecting system.

When a user turns on the power switch 29 of the terminal 1a, for example, the power-on information is transmitted from the information converter 22 to the application server 7 of the information processing center 3 via the communication circuit 23 and network 2. Receiving the power-on information from the terminal 1a, the application server 7 has its decision section 32 decide as to the information, and read initial picture information from the client application memory 33. Then, the application server 7 transmits the initial picture information to the terminal via the client display screen constructor 34, transmitting section 35 and network 2. Receiving the initial picture information through the communication circuit 23, the screen constructor 24 in the terminal 1a generates the initial picture from the initial picture information, and the display controller 26 displays the initial picture on the display device 25 as shown in FIG. 4A. The initial picture reads "Input user ID", for example. When the user input his or her ID from the information input device 21, the ID is converted to the transmitted information by the information converter 22, and is transmitted from the communication circuit 23 to the application server 7 of the information processing center 3 via the network 2.

In the application server 7, the input information receiving section 31 receives the ID information, and the decision section 32 makes a decision about the content of the ID and starts an application program stored in the client application memory 33 according to the decision result. In addition, reading information specified by the ID information from the client application memory 33, the client display screen constructor 34 constructs a client display picture, and transmits it to the terminal 1a through the transmitting section 35 and network 2.

Figure 4B:
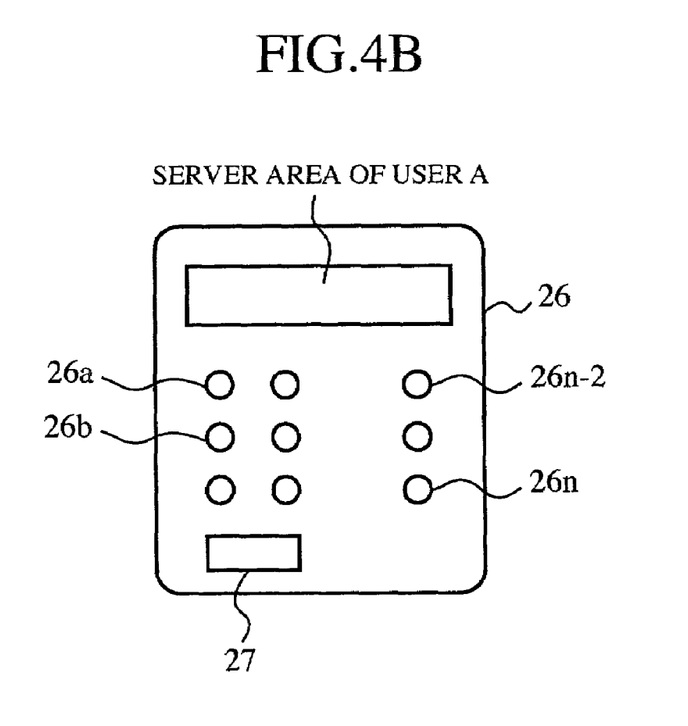

In the terminal 1a, the screen constructor 24 reconstructs the transmitted picture, and the display controller 26 displays it on the display device 25 as shown in FIG. 4B. In this way, many menu items (icons) 26a–26n are displayed along with a menu item 27 of the picture immediately before the previous power off. Thus, the user selects a desired menu item from among the displayed menu items 26a–26n using the information input device 21. For example, when a web browser menu item (such as today's news or weather forecast) is selected, the requested information corresponding to the menu item is transmitted from the communication circuit 23 to the application server 7 via the network 2.

Receiving the requested information from the terminal 1a, the application server 7 activates the web browser application. The web browser application extracts desired information like today's news from the WWW server, and supplies it to the client display screen constructor 34 which transmits the client display picture to the terminal. As a result, the today's news is displayed on the display screen of the terminal.

Alternatively, the web browser application can transmit to the terminal a web browser picture prepared in advance that shows icons of today's news, weather forecast and the like, in which case, the initial icon is used for activating the web browser.

As described above, according to the present embodiment 1, the information processing center 3 automatically generates the initial picture in response to the power-on information sent from the terminal 1a, and transmits the initial picture to the terminal 1a to be displayed. Then, receiving the ID information or the like the user inputs onto the initial picture from the terminal 1a, the information processing center 3 transmits the menu picture to the terminal 1a. Thus, the user of the terminal 1a selects one of the menu items in the menu picture so that it is transmitted to the information processing center 3. The information processing center 3 carries out required processing according to the menu item, and transmits the processing result to the terminal 1a so that the display controller 26 in the terminal 1a displays it on the display device 25. In this way, the information processing center 3 executes all the information processings, and hence a power trouble that can take place in the terminal presents no substantial problem because the information processing center 3 holds the content displayed on the terminal.

Furthermore, since it is enough for the terminal 1a to have the functions to transmit the requested information to the information processing center 3, to receive the information from the information processing center 3 and to display the received information, the configuration of the terminal 1a becomes simple without the drives such as a radiating fan, a CD-ROM drive and a hard disk drive, resulting in a highly reliable, silent system. In addition, since the user can start the normal operation of the terminal 1a by only turning it on so that it automatically starts its transmission and reception, the prescribed operating procedure required by a common microcomputer can be eliminated. As a result, the present embodiment 1 can provide user-friendly operation, allowing a user unfamiliar to the terminal operation to use it with ease. Moreover, since the applications executed by the individual terminals in the conventional system are installed in the server, the change of the applications is accomplished by only changing the applications on the server side without changing the software of each of the many terminals.

Embodiment 2

Figure 5:
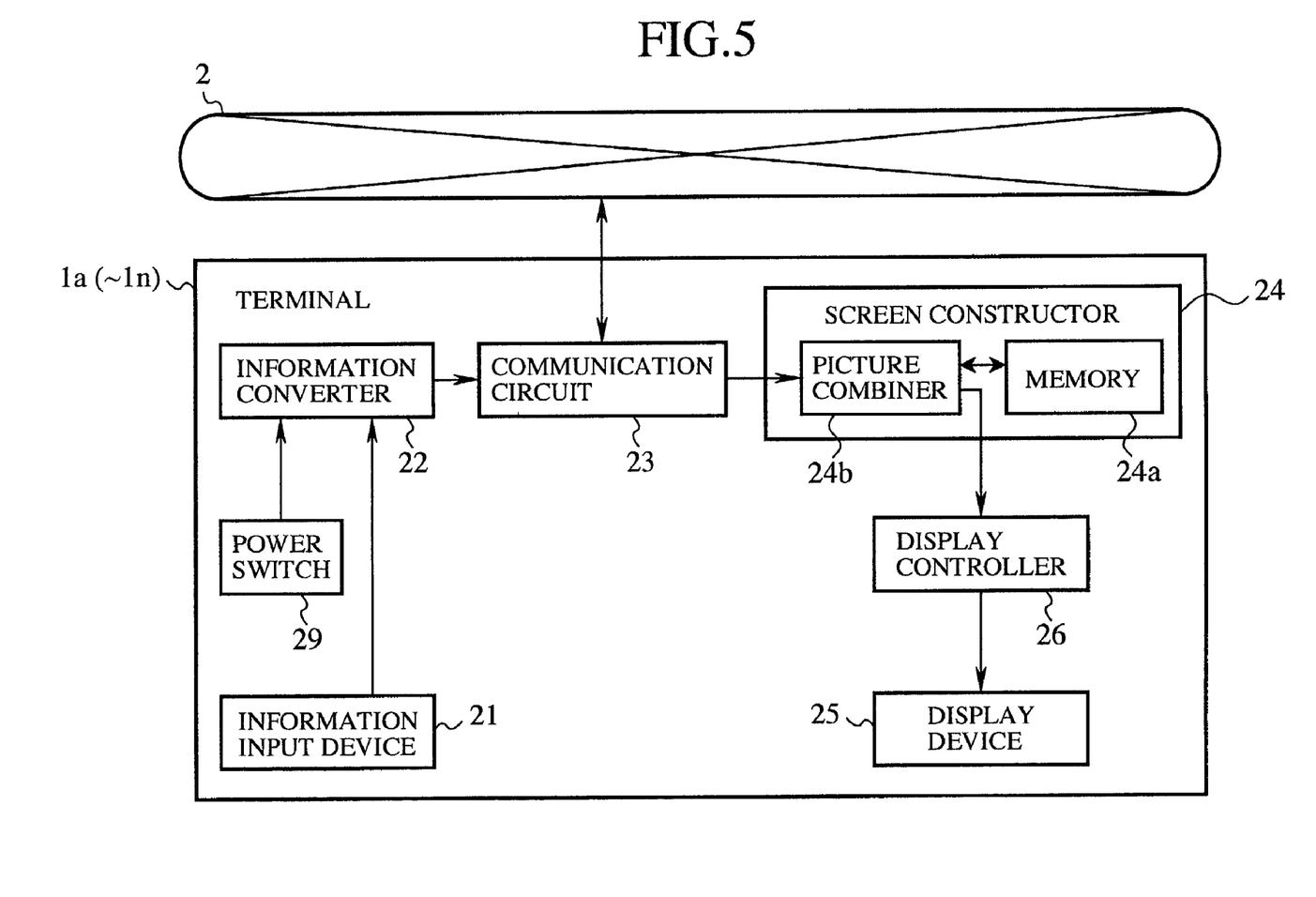
FIG. 5 is a block diagram showing a configuration of a terminal in an embodiment 2 of the information collecting system in accordance with the present invention.

FIG. 5 is a block diagram showing a configuration of a terminal in an embodiment 2 of the information collecting system in accordance with the present invention, in which the same reference numerals designate the same or like components to those of FIG. 2, and the description thereof is omitted here. In FIG. 5, the screen constructor 24 comprises a memory 24a for storing current display picture information, and a picture combiner 24b for summing up the received picture information and the picture information read out of the memory 24a.

Figure 6:
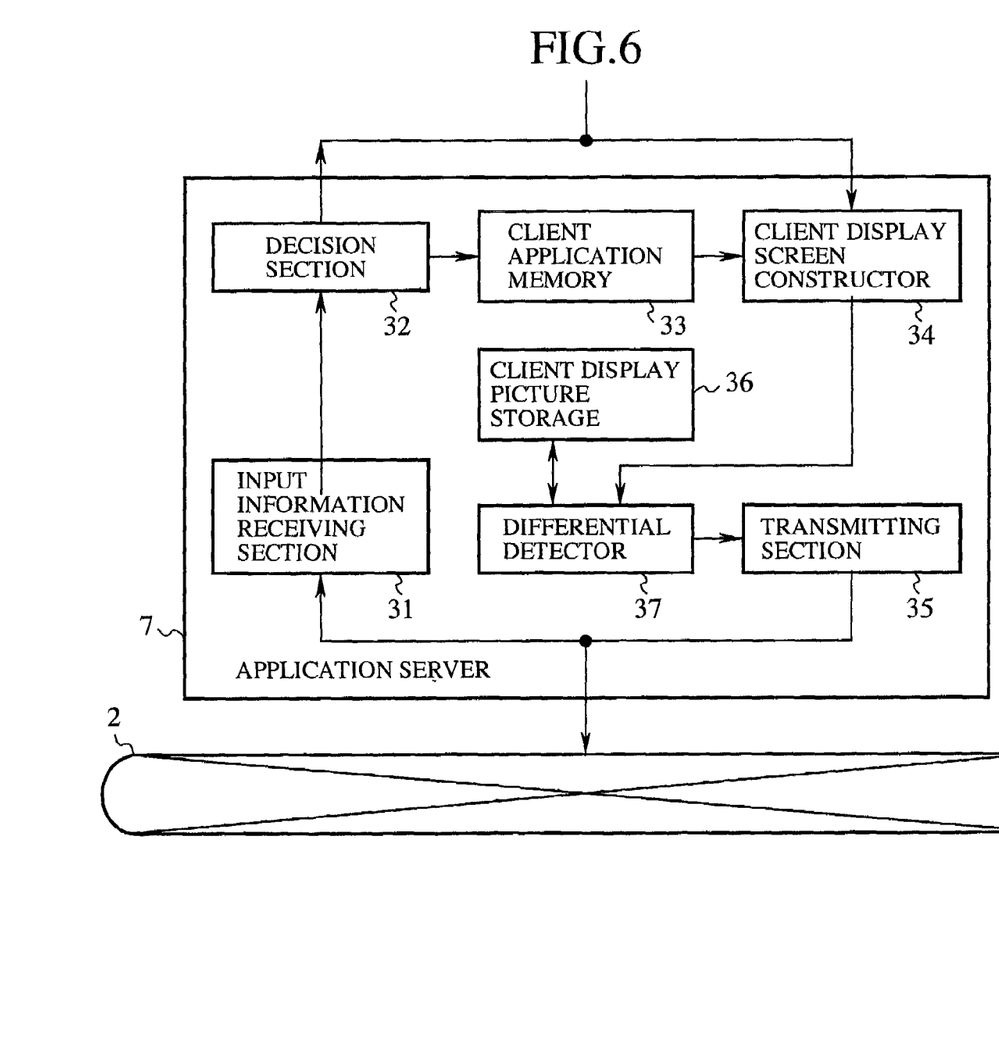
FIG. 6 is a block diagram showing a configuration of the application server 7 in the embodiment 2 of the information collecting system.

FIG. 6 is a block diagram showing a configuration of the application server 7 in the embodiment 2 of the information collecting system, in which the same reference numerals designate the same or like components to those of FIG. 3, and the description thereof is omitted here. In FIG. 6, the reference numeral 36 designates a client display picture storage; and 37 designates a differential detector for detecting the difference between the picture generated by the client display screen constructor 34 and the picture stored in the client display picture storage 36.

Next, the operation of the present embodiment 2 will be described.

First, when a user turns on the terminal 1a by depressing the power switch 29, it displays the initial picture on the display device 25 via the display controller 26 in accordance with the initial picture information transmitted from the information processing center 3. Subsequently, it displays the many menu items (icons) 26a–26n and the menu 27 of the picture immediately before the previous power off. Since the operation up to the menu display is the same as that of the foregoing embodiment 1, the detailed description thereof is omitted here.

Then, when the user selects the web browser menu (such as today's news or weather forecast), for example, from among the many menu items 26a–26n as in the embodiment 1, the terminal 1a transmits the requested information corresponding to the selected menu item from the communication circuit 23 to the application server 7 via the network 2.

Receiving the requested information sent from the terminal 1a, the application server 7 activates the web browser application. The web browser application extracts the desired information like today's news from the WWW server 5, and provides it to the client display screen constructor 34 which generates new client display picture information and transfers it to the differential detector 37. The differential detector 37 detects the difference between that newly generated picture information and the picture information stored in the client display picture storage 36, and transmits the differential information from the transmitting section 35 to the terminal 1a through and network 2.

In the terminal 1a, the picture combiner 24b combines the picture information (differential information) received by the communication circuit 23 with the picture information stored in the memory 24a to generate a new display picture, and the display controller 26 displays the picture on the display device 25.

As described above, according to the present embodiment 2, the information processing center 3 transmits only the differential information between the picture already displayed on the terminal and the newly generated picture, so that the terminal can construct the new display picture from the differential information and the information about the current picture. Thus, the present embodiment 2 can accelerate the information transmission by reducing the amount of the transmitted information, with ensuring the security of the transmitted information.

Embodiment 3

Figure 7:
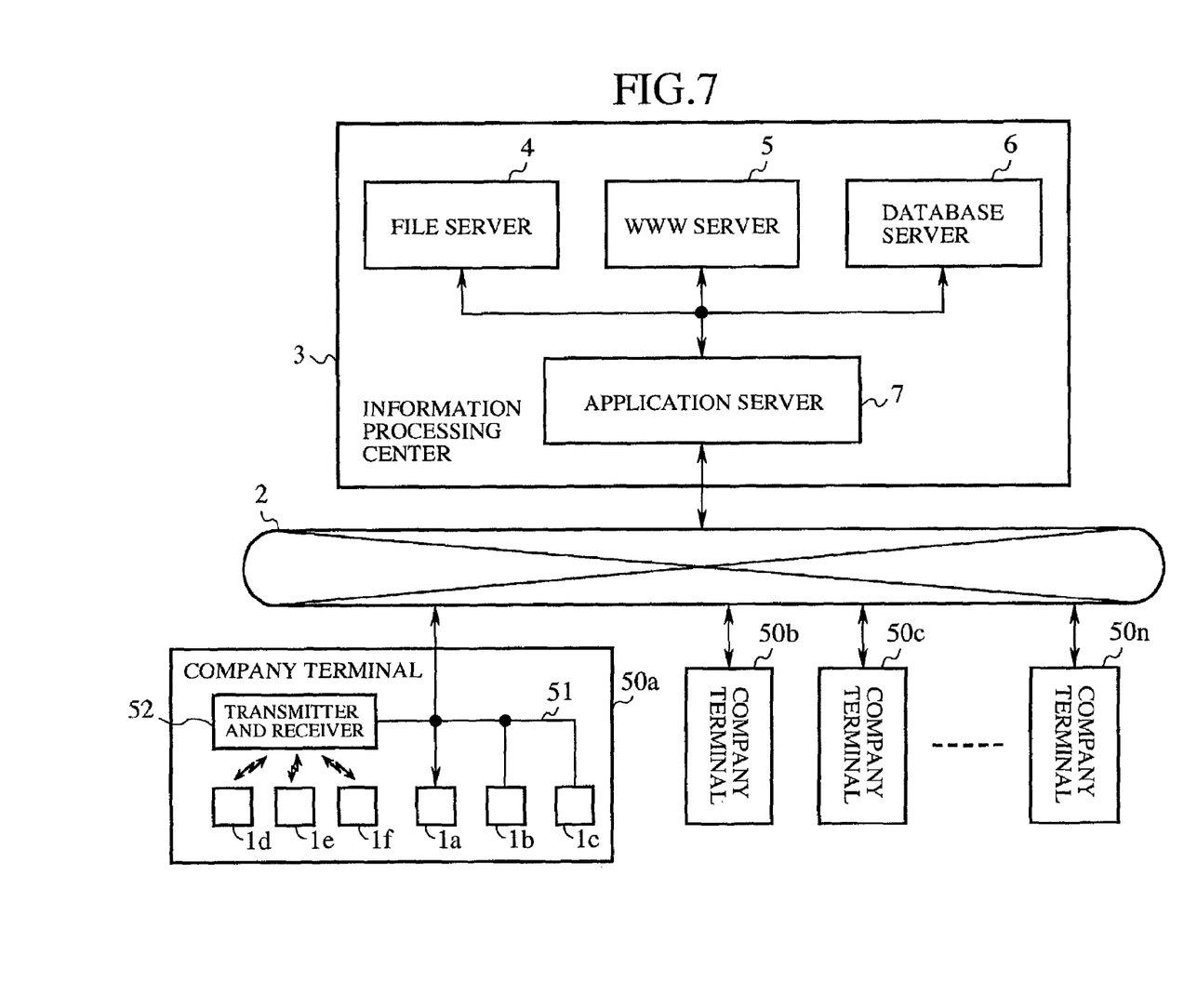
FIG. 7 is a block diagram showing a configuration of an embodiment 3 of the information collecting system in accordance with the present invention.

FIG. 7 is a block diagram showing a configuration of an embodiment 3 of the information collecting system in accordance with the present invention. The present embodiment 3 applies the information collecting system in accordance with the present invention to the business information technology in a company. In FIG. 7, the same reference numerals designate the same or like components to those of FIG. 1, and the description thereof is omitted here. In FIG. 7, reference numerals 50a–50n each designates a terminal installed in a limited area such as a company. The company terminals 50a–50n each comprise terminals 1a–1c with the configuration as shown in FIG. 2 or 5. The application server 7 of the information processing center 3 has the same configuration as that of FIG. 3 or 6.

The company terminals 50a–50n each comprise the terminals 1a–1c that are assigned to a department in the company such as the sales department, accounts department, personnel department and intellectual property department, and that are connected to the LAN 51 which is connected to the network 2. The reference numeral 52 designates a transmitter and receiver connected to the LAN 51 for exchanging information with terminals 1d–1f.

Next, the operation of the present embodiment 3 will be described.

First, when a user turns on the terminal 1a in the intellectual property department in the company terminal 50a, for example, it displays the initial picture on the display device 25 via the display controller 26 using the picture information transmitted from the information processing center 3. Subsequently, it displays the many menu items (icons) 26a–26n and the menu 27 of the picture immediately before the previous power off. Since the operation up to the menu display is the same as that of the foregoing embodiment 1 or 2, the detailed description thereof is omitted here.

Then, when the user selects the patent search from among the many menu items 26a–26n using the information input device 21, the selected menu information is transmitted from the information converter 22 to the application server 7 of the information processing center 3 through the communication circuit 23 and network 2.

Receiving the transmitted information at the input information receiving section 31, the application server 7 starts a patent search application. The patent search application activates the client display screen constructor 34 to generate an initial picture for retrieving an abstract and the like. The differential detector 37 detects the difference between the picture generated by the client display screen constructor 34 and the picture stored in the client display picture storage 36, and transmits only the differential information from the transmitting section 35 to the terminal 1a via and network 2, with updating the picture stored in the client display picture storage 36 by supplying it with the differential information.

In the terminal 1a, the differential information received by the communication circuit 23 is supplied to the screen constructor 24. The screen constructor 24 updates the picture information stored in the memory 24a using the differential information, and displays the picture on the display device 25 through the display controller 26. When the user inputs a patent number from the information input device 21 in the terminal 1a, the patent number is transmitted to the application server 7 via the network 2. The application server 7 decides as to whether the patent number is a pre-registered number by comparing the patent number with the database information using the patent search application, and retrieves from the file server 4 the abstract information corresponding to the patent number if it is registered so that the client display screen constructor 34 generates a client display picture. Then, the differential detector 37 detects the difference between the picture generated by the client display screen constructor 34 and the picture stored in the client display picture storage 36, and transmits only the differential information from the transmitting section 35 to the terminal 1 via the network 2, with updating the picture stored in the client display picture storage 36 by supplying it with the differential information.

In the terminal 1a, receiving the differential information via the communication circuit 23, the screen constructor 24 updates the picture information stored in the memory 24a, and displays the picture on the display device 25 through the display controller 26.

Other processings such as word processing, spreadsheets and CAD used by other departments, sales department, for example, are processed in the same manner. That is, when one of the menu items is selected on the terminal, the corresponding application is started in the information processing center 3 to be processed using the database server 6.

Incidentally, the terminals 1d, 1e and 1f exchange information with the transmitter and receiver 52 connected to the LAN 51 by radio. In this case also, the information processing center 3 carries out all the processings required, providing the terminals 1d–1f with the processed results only.

As described above, according to the present embodiment 3, the information processing center 3 comprises the processing software of the individual departments of the company, the processings of which departments are alike to each other. Thus, it is unnecessary for the terminals to comprise the applications, which means that when updating the versions of the applications, only the information processing center has to replace its applications without changing the software of the terminals, thereby reducing the job of system operators. Therefore, the present embodiment 3 can reduce the number of the system operators and the operating cost at the same time.

Embodiment 4

Figure 8:
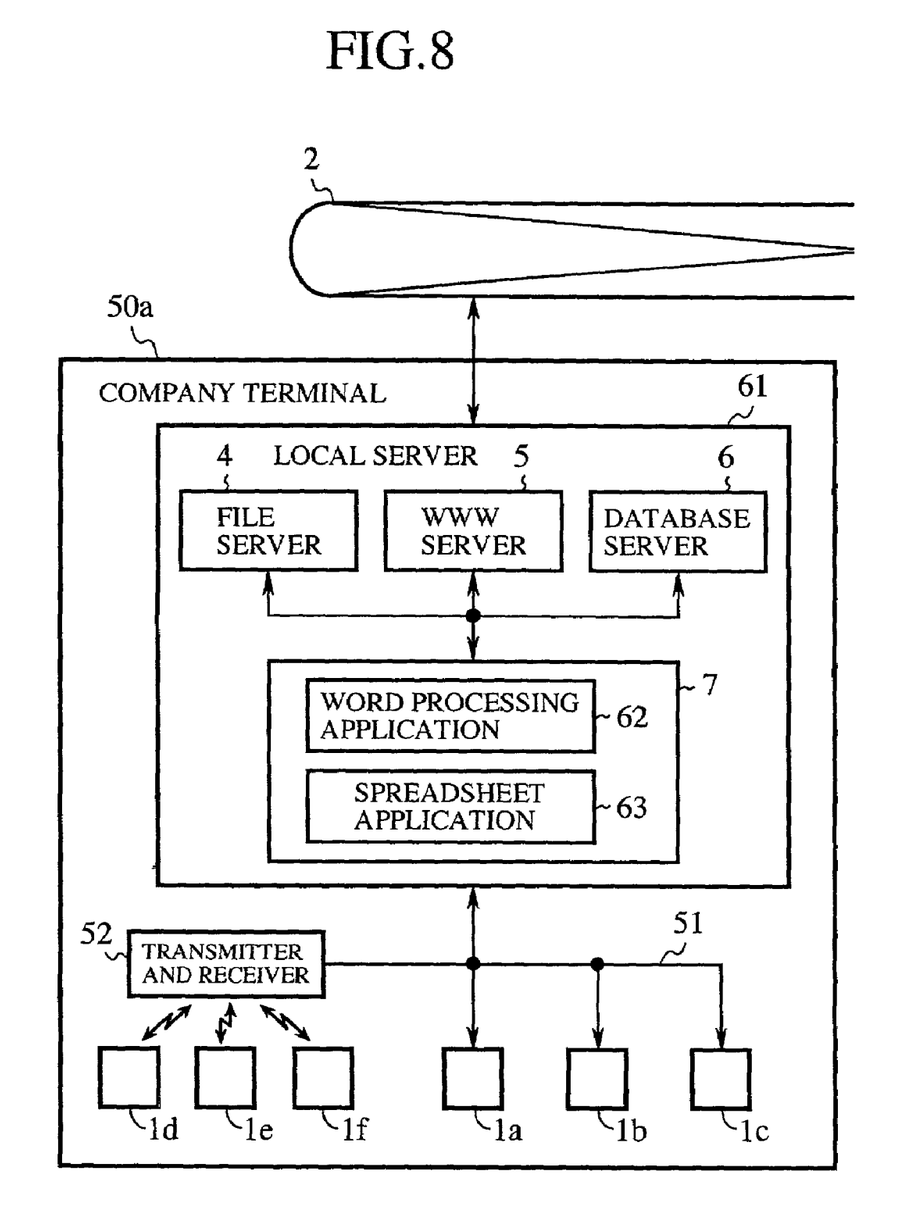
FIG. 8 is a block diagram showing a configuration of a terminal installed in a company in an embodiment 4 of the information collecting system in accordance with the present invention.

FIG. 8 is a block diagram showing a configuration of an embodiment 4 of the information collecting system in accordance with the present invention. It has a special contrivance in the company terminals: the LAN 51 is not directly connected to the network 2, but a local server 61 including an application server is interposed between the LAN 51 and the network 2. The local server 61 is always connectable just as the information processing center 3.

The local server 61 comprises a word processing application 62 and a spreadsheet application 63 that are used frequently, whereas the information processing center 3 comprises applications that are used less frequently such as the application for patent search.

Next, the operation of the present embodiment 4 will be described.

When a user turns on one of the terminals connected to the LAN 51, and selects the menu item of the word processing applications 62 or spreadsheet applications 63 from the menu displayed on the terminal, the selected menu information is transmitted from the information converter 22 to the local server 61 via the communication circuit 23.

Receiving the menu information, the local server 61 activates the word processing applications 62 or the spreadsheet applications 63 to prepare a written document or spreadsheet, and transmits its result to the terminal 1a via the LAN 51 so that it displays the result on the display device 25 through the display controller 26. On the other hand, when a menu item is selected that is used less frequently, the patent search menus, for example, the selected menu information is transmitted to the information processing center 3 via the LAN 51, local server 61 and network 2. The information processing center 3 starts the patent search application to carry out the required processing, and transmits the processing result to the terminal 1a via the network 2, local server 61 and LAN 51, so that the terminal 1a displays the processing result on the display device 25 through the display controller 26.

As described above, according to the present embodiment 4, the local server 61 in the company carries out the processings that are used frequently, thereby reducing the amount of information transferred between the terminal and the information processing center 3 through the network. Accordingly, the present embodiment 4 can reduce the intensive use of the network with decreasing errors in information transmission.

Embodiment 5

Figure 9:
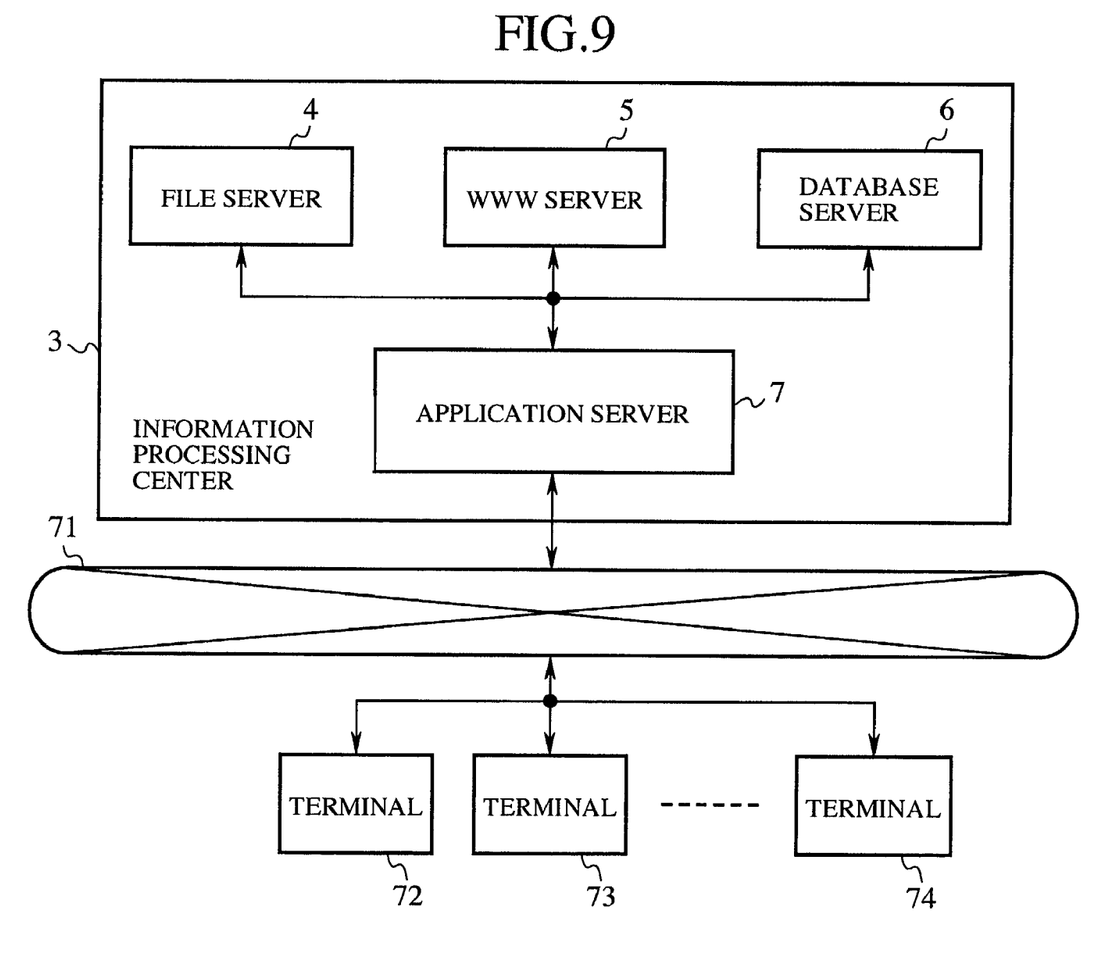
FIG. 9 is a block diagram showing a configuration of an embodiment 5 of the information collecting system in accordance with the present invention.

FIG. 9 is a block diagram showing a configuration of an embodiment 5 of the information collecting system in accordance with the present invention. The present embodiment 5 expands the company business information technology of the embodiment 3 to outside the company. In FIG. 9, the same reference numerals designate the same components as those of FIG. 1, and the description thereof is omitted here. In FIG. 9, the reference numeral 71 designates a network connected to the information processing center 3 as shown in FIG. 1, which network comprises a CATV network, wired telephone network, wireless telephone network or the like. The reference numeral 72 designates a terminal installed in a hotel; 73 designates a mobile terminal; and 74 designates a terminal installed in an aircraft. These terminals comprise at least the same functions of the terminal as shown in FIG. 2 or 5. For example, the terminal 72 is connectable to the information processing center 3 via the CATV network, the mobile terminal 73 is connectable from the outside to the information processing center 3 via the wired telephone network, and the terminal 74 is connectable to the information processing center 3 via the wireless telephone network. Thus, the information processing center 3 carries out the required processing, and the terminal can receive the processing result.

What is claimed is:

1. An information collecting system comprising:
at least one terminal including an information input device, an information display unit and a communication circuit; and
an information processing center that is connected to said terminal via a network, and includes an application server, said application server including:
 a receiving section for receiving input information transmitted from said terminal to said information processing center via the network;
 an information processing section for making a decision as to the information received, and for constructing a picture to be displayed on the terminal in response to a decision result; and
 a transmitting section for transmitting the picture generated by said information processing section to said terminal;
wherein said terminal includes a circuit for detecting power-on of the terminal, and for automatically activating said communication circuit to transmit power-on information to said information processing center,
wherein said information processing center further comprises a database server, a file server and a WWW server,
wherein said information processing section in said application server carries out information processing by exchanging information with these servers,
wherein said receiving section of said application server receives the power-on information sent from said terminal via the network, said information processing section of said application server generates an initial picture for the terminal in response to the information received, and said transmitting section in said application server transmits the initial picture to the terminal,
wherein said initial picture including a display portion for receiving user input of identification information to be transmitted to said information processing section, and, in response to receiving said user input of identification information, said information processing section to send to the terminal a subsequent picture including a plurality of menu items for user selection, including a menu item for a picture displayed on the terminal immediately before previous power-off of the terminal, and said information processing section to send to the terminal, for display, information associated with at least one of the plurality of menu items in response to said user selection,
wherein said information processing section of said application server further comprises:
a client application memory for storing in advance necessary information including identifying information of a user; and
a client display screen constructor for constructing a client display picture from the necessary information read out of said client application memory and information supplied from other servers,
wherein said application server further comprises:
a client display picture storage for storing the client display picture generated by said client display screen constructor; and
a differential detector for detecting a difference between the client display picture stored in said client display picture storage and a client display picture newly generated by said client display screen constructor, and
wherein said transmitting section transmits only differential information detected by said differential detector to said terminal.

2. The information collecting system according to claim 1, wherein said terminal comprises a picture combiner for combining the differential information sent from said transmitting section with picture information currently displayed by the terminal.

3. The information collecting system according to claim 1, wherein said terminal is connected to a LAN (Local Area Network), and said LAN is connected to said network.

4. The information collecting system according to claim 3, further comprising:
a local server connected between said LAN and said network, wherein said local server includes a database server, a file server, a WWVV server and an application server for carrying out information processing using information exchanged with these servers, and wherein said local server performs a processing associated with predetermined requested information in the information transmitted from said terminal, transmits a processing result to said terminal, and transmits remaining requested information to said information processing center via said network without processing the remaining requested information.

5. The information collecting system according to claim 1, wherein said information processing center carries out processing associated with predetermined requested information in the information transmitted from said terminal, and transmits remaining requested information to another information processing center via said network without processing the remaining requested information.

6. The information collecting system according to claim 4, wherein said application server in said local server comprises at least one of a word processing application and a spreadsheet application.

7. A method of providing information collection services, comprising:

receiving power-on information from at least one of a plurality of terminals to generate an initial picture for the at least one terminal in response to the information received, wherein said initial picture including a display portion for receiving user input of identification information;

receiving said user input of identification information to generate a subsequent picture for the at least one terminal including a plurality of menu items for user selection, including a menu item for a picture displayed on the terminal immediately before previous power-off of the terminal; and receiving said user selection of a menu item to generate information associated with the selected menu item for display on the terminal;

constructing said subsequent picture and storing said subsequent picture into memory;

detecting a difference between the subsequent picture stored in memory and a picture newly generated to display said information associated with the selected menu item; and transmitting only differential information associated with said detected difference to the terminal.

\* \* \* \* \*